Aug. 19, 1930.   T. J. STURTEVANT   1,773,287
APPARATUS FOR MANUFACTURING ACID PHOSPHATE
Filed May 18, 1927   7 Sheets-Sheet 6
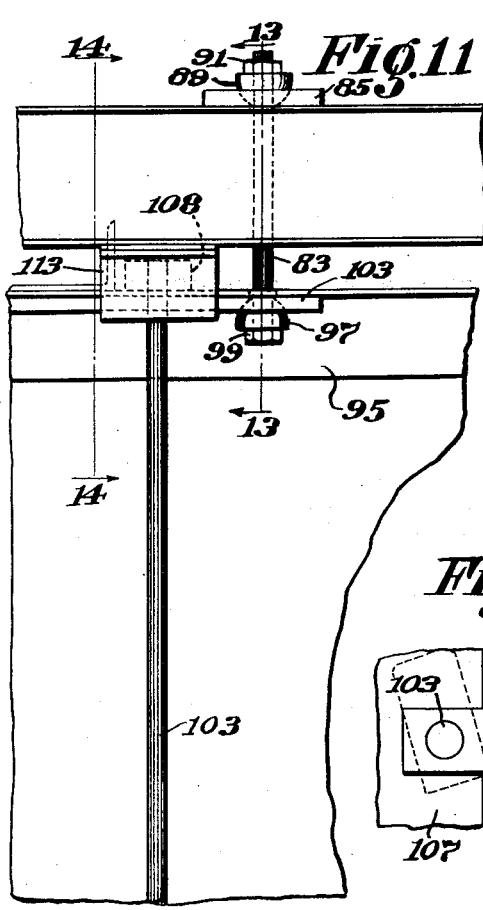
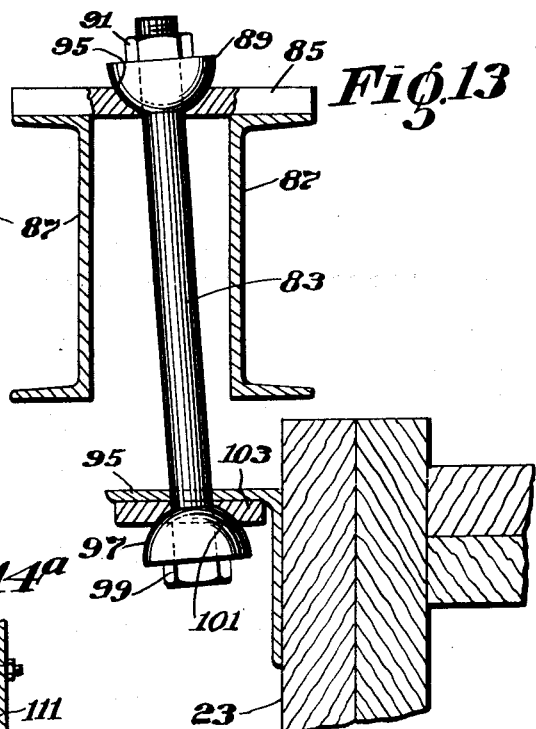
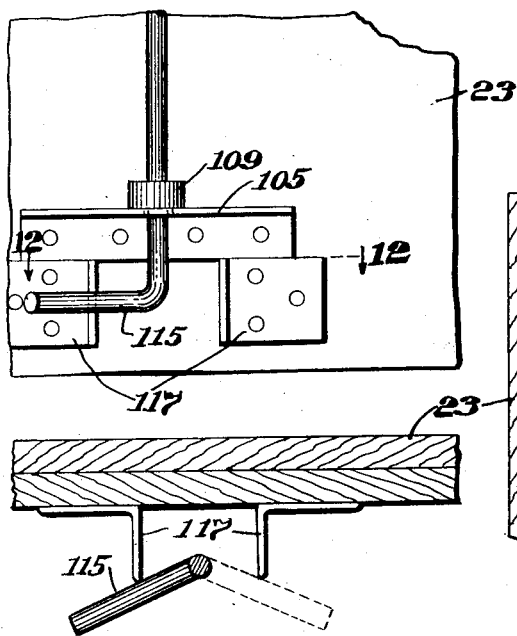
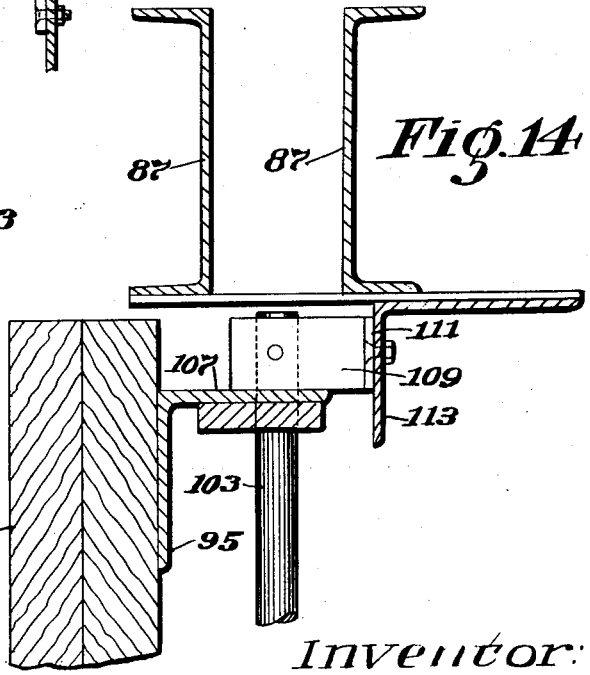
Inventor:
Thomas J. Sturtevant
BY Henry T. Williams
Attorney Aug. 19, 1930.   T. J. STURTEVANT   1,773,287
APPARATUS FOR MANUFACTURING ACID PHOSPHATE
Filed May 18, 1927    7 Sheets-Sheet 7
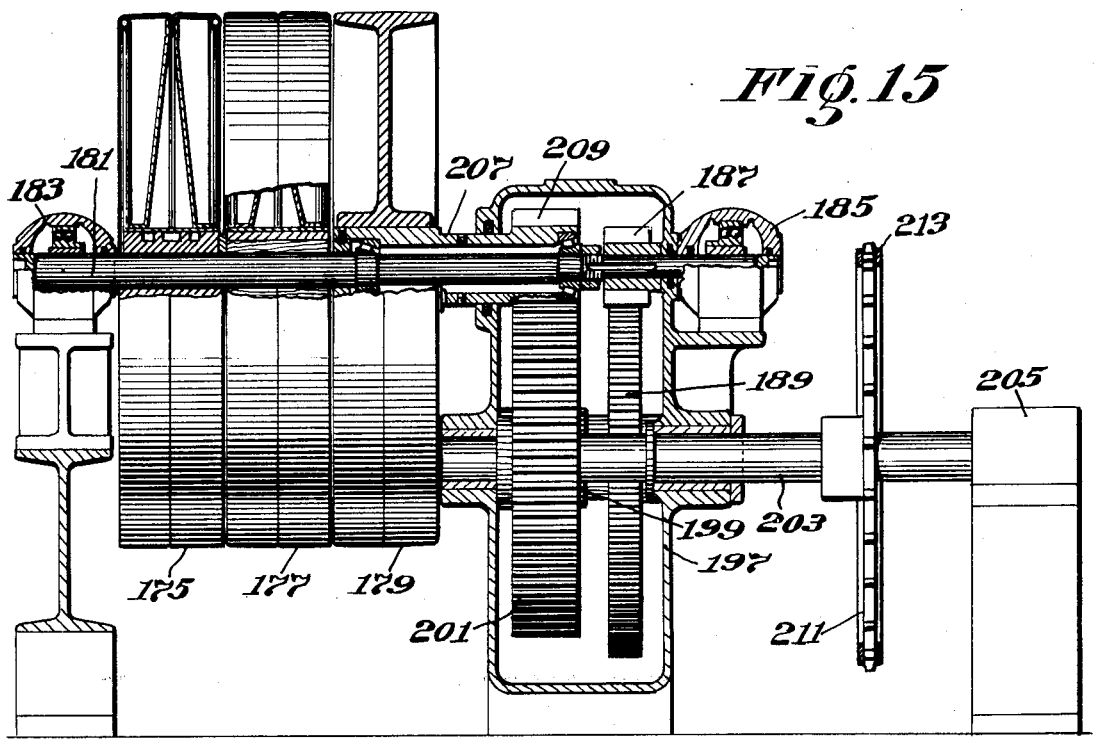
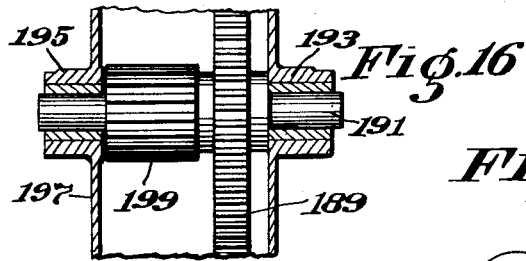
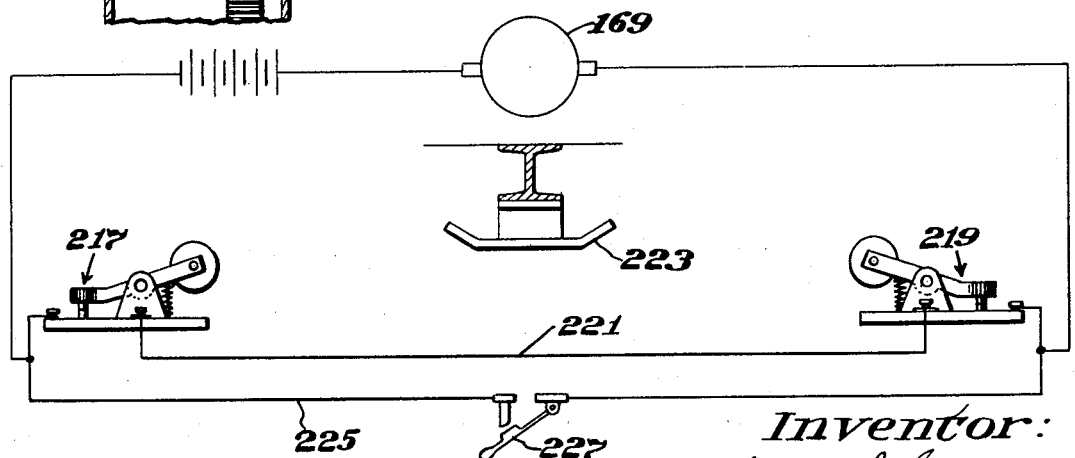

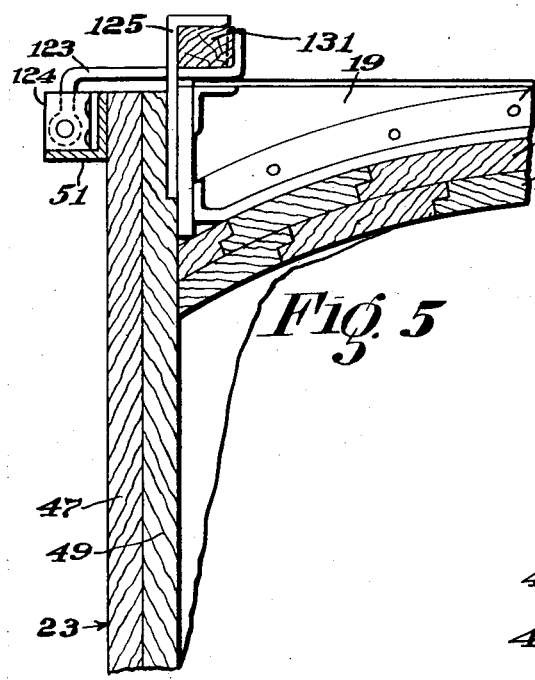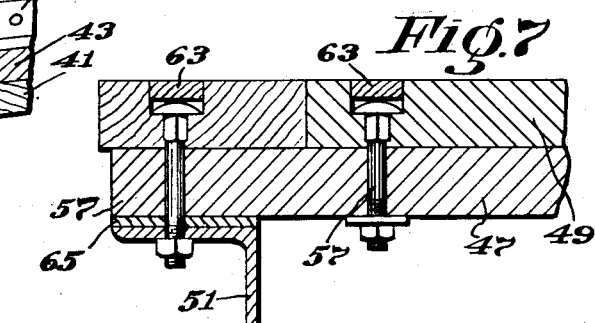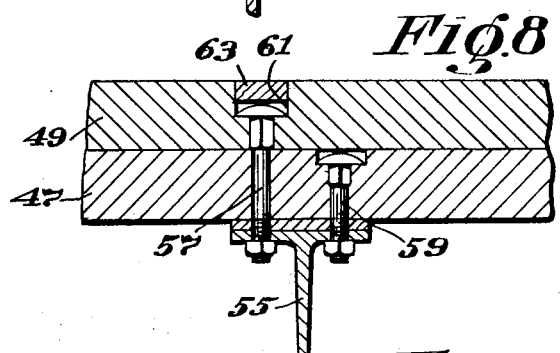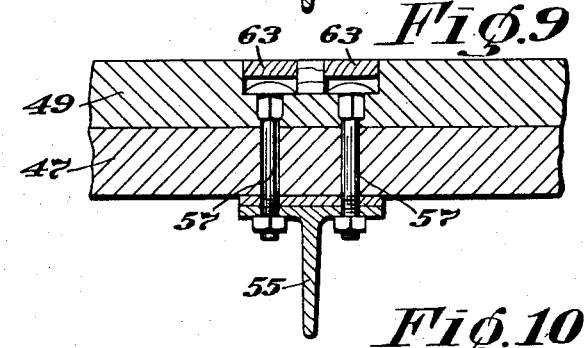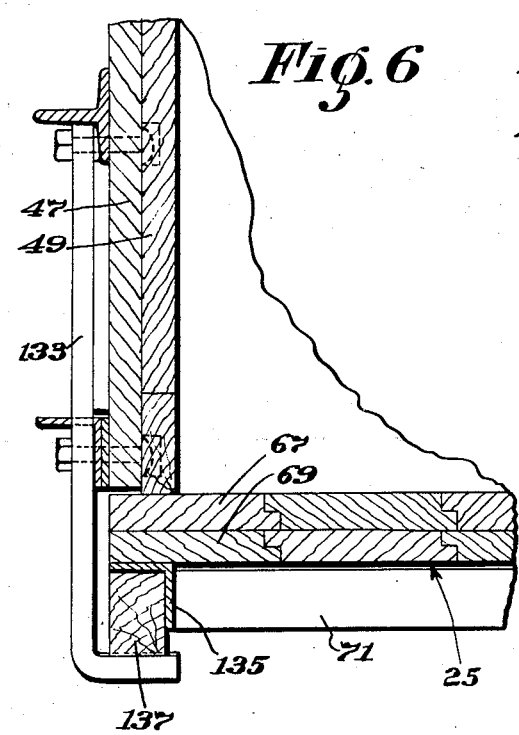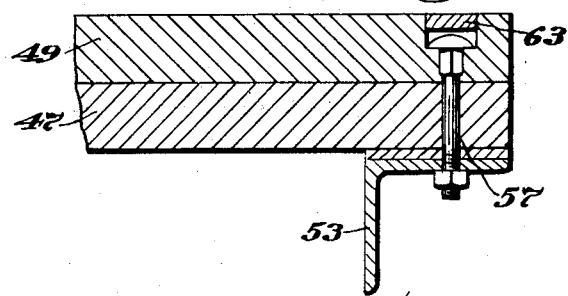

Patented Aug. 19, 1930

1,773,287

UNITED STATES PATENT OFFICE

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS

APPARATUS FOR MANUFACTURING ACID PHOSPHATE

Application filed May 18, 1927. Serial No. 192,404.

The invention to be hereinafter described relates to apparatus for manufacturing acid phosphate.

Acid phosphate is made by mixing ground phosphate rock dust with sulphuric acid. The mixture is discharged into a box or den to allow a chemical reaction to take place. The mixture when introduced into the den, is in a molten or semi-liquid condition, but after remaining in the den a sufficient time it will change into a solid block of spongy mass form. Then the block is excavated or disintegrated, and the broken down materials are carried to a storage pile where the chemical reaction is allowed to continue.

The mechanical den and excavator are the modern equipment used for making acid phosphate, and replace the old fashioned method of excavating by hand.

One of the purposes of the present invention is to provide an improved automatic mechanical den and excavator of the type in which the excavator has a stationary mounting and the floor of the den is on a carriage adapted to feed the block of acid phosphate toward the excavator that it may be disintegrated thereby.

Preparatory to feeding the block toward the excavator, it is desirable that the side walls of the den shall be moved outward away from the block, and stand wholly clear of the same in order that they may not interfere with the ready feeding of the block toward the disintegrator. Another purpose of the invention, therefore, is to provide side walls which are suspended by hangers from an overhead support, the construction being such that the side walls when released will automatically tend to move outward and stand well away from the block.

Another purpose of the invention is to provide securing means which may be conveniently and readily operated to lock the side walls in their closed position, and to release the side walls so that they may move outward.

Another purpose of the invention is to provide means for releasably holding the rear ends of the side walls against the back wall, and means for releasably holding the door of the den against the front ends of the side walls.

Sometimes the acid phosphate will solidify into a block which does not have parallel sides. The construction and arrangement of the hangers are such that they will permit the side walls to move bodily outward and prevent any possibility of the block wedging between the sides and consequent breaking down of portions of the block as the carriage carrying the same is fed toward the disintegrator.

Another purpose of the invention is to provide desirable mechanism for automatically arresting the carriage carrying the block at the completion of the excavation operation, and for automatically arresting the travel of the carriage when it has returned into the space between the side walls where it is in readiness to receive the next charge of ground phosphate rock and acid. The construction of this mechanism is such that the carriage carrying the block is given a slow work feed toward the disintegrator and when empty is given a more rapid return feed.

Still another purpose of the invention is to provide an improved effective supporting structure arranged in desirable combination with the top and suspended side walls of the den and with the rotary disintegrator.

With the aforesaid and other purposes in view, the character of the invention may be best understood by reference to the following description of one good form thereof shown in the accompanying drawings, wherein:

Fig. 1 is a side elevation of apparatus embodying the invention;

Fig. 1ᵃ is a front view of the door of the den;

Fig. 2 on an enlarged scale is a vertical section taken on line 2—2 of Fig. 1;

Fig. 3 on an enlarged scale is a horizontal section taken on line 3—3 of Fig. 1;

Fig. 4 on an enlarged scale is a vertical section taken on line 4—4 of Fig. 1;

Fig. 5 is a horizontal sectional detail showing a portion of the back wall and a portion of one of the side walls;

Fig. 6 is a horizontal sectional detail showing a portion of the door and one of the side walls;

Figure 1:
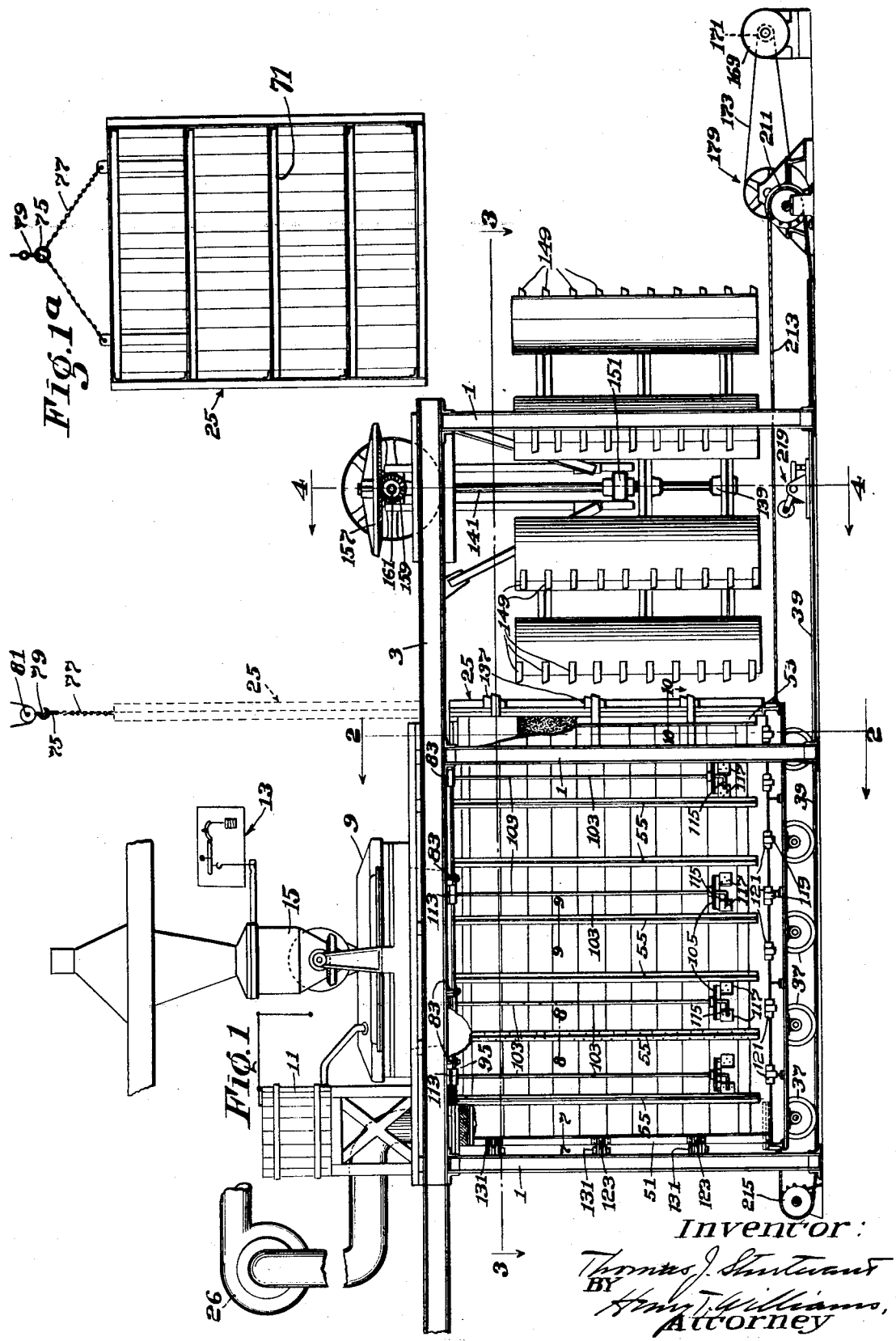

Fig. 7 on an enlarged scale is a section taken on line 7—7 of Fig. 1;

Fig. 8 on an enlarged scale is a section taken on line 8—8 of Fig. 1;

Fig. 9 on an enlarged scale is a section taken on line 9—9 of Fig. 1;

Fig. 10 on an enlarged scale is a section taken on line 10—10 of Fig. 1;

Fig. 11 on an enlarged scale is a side elevation of a portion of the support, a portion of one of the side walls, and shows one of the side wall hangers, and one of the shafts having the cam for locking the side wall in its inward or closed position;

Fig. 12 is a horizontal section taken on line 12—12 of Fig. 11;

Fig. 13 on an enlarged scale is a vertical section taken on line 13—13 of Fig. 11;

Fig. 14 on an enlarged scale is a vertical section taken on line 14—14 of Fig. 11;

Fig. 14ᵃ is a detail of one of the side wall locking cams and parts associated therewith;

Fig. 15 is a view partly in section and partly in elevation of gear mechanism employed in feeding the carriage;

Fig. 16 is a sectional detail through a portion of the gear casing showing the gear and pinion on one of the countershafts; and Fig. 17 is a view of the motor circuit and the switch arrangement for controlling the starting and stopping of the motor.

Referring to the drawings, the apparatus, shown therein as embodying the invention, comprises a support including uprights or posts 1 (Figs. 1 and 2) on the tops of which are mounted longitudinal I-beams 3. Extending between and connected to the longitudinal beams are cross I-beams 5 distributed at intervals along the longitudinal beams. On the cross beams is a platform 7 on which is mounted a pan type mixer 9 and the acid measuring tank 11. Above the mixer are a dust measuring scale 13 and a hopper 15 leading from the scale to the mixer.

The den for receiving the mixture of ground phosphate rock and sulphuric acid comprises a top 17, floor 19, back wall 21, side walls 23 and front door 25. A blower 26 is provided for drawing noxious gases from the den.

The top 17 (Fig. 2) of the den is secured to and beneath the cross beams 5 of the support, and comprises two layers 27 and 29 of planking, the planks of which are tightly joined by ship seams. The top has an inlet opening 31 provided with a valve 33 which may be lifted to admit the mixture into the den at the times desired.

The floor 19 (Fig. 2) of the den is mounted on a carriage 35 having wheels 37 for travel along rails 39.

The back wall 21 (Figs. 3 and 5) is curved on a radius corresponding to the radius of the disintegrator cutters to be described, and comprises an inner replaceable layer 41 and an outer layer 43 of planking, the planks of said layers being tightly joined by ship seams. Secured to these layers of planking are curved ribs 45 of angle-iron form, the lowest of said ribs being bolted to the floor of the carriage.

Each of the side walls 23 (Fig. 2) of the den comprises an outer layer 47 and an inner replaceable layer 49 of planking, the planks of each layer being tightly joined by ship seams. The side walls are provided with vertical ribs extending along the outer layers of the walls, said ribs including end ribs 51 and 53 (Fig. 1) of angle form and intermediate ribs 55 of T-form. These ribs are secured to the side walls by carriage bolts including bolts 57 (Figs. 7 to 10) which extend through the outer and inner layers of the walls, and shorter bolts 59 which extend only through the outer layers of the walls and the ribs. The heads of the longer bolts are in countersunk holes 61 in the inner layers of the walls, said heads being covered by wooden plugs 63 which protect the bolts from injurious action by the materials in the den. Shims 65 may be interposed between the ribs and the outer layers of the walls, and the bolts may pass through the shims. The construction is such that the outer and inner layers of the walls are strongly secured together, and the ribs are strongly secured to the walls. When the inner layers become worn and new layers are to be substituted therefor, the longer bolts 57 are removed and without disturbing the connection of the ribs with the outer layers.

The front door 25 comprises inner and outer layers of planking 67 and 69 (Fig. 6), the planks of each layer being securely joined by ship seams. Extending horizontally along the outer layer of the door are angle-iron ribs 71 (Fig. 1ᵃ), the layers and the ribs being secured together by bolts as shown and described with respect to the side walls. Fastened to the top of the door is a sling 77 having a ring 75 connected with the hook 79 carried by a pulley 81 which may be raised and lowered by a usual electric motor operated hoist which is unnecessary to show herein.

Next will be described the means for suspending the side walls from the support, reference being had more particularly to Figs. 11 and 13. This means comprises hanger bolts 83 which extend through holes in plates 85, each mounted on and bridging a pair of short channels 87 extending between and secured to cross beams 5, referred to. Each bolt has a rounded head 89 on the upper end thereof bearing against a nut 91 threaded onto the bolt, said head being seated in a socket 93 having a curvature corresponding to that of the head. The bolt projects down between the channels 87 and through a hole in an angle-iron 95 secured to the upper end of the side wall. The lower portion of the bolt receives a rounded head 97 resting against the head 99 of the bolt. The rounded head is seated in a socket 101 curved to conform to the contour of the head, said socket being formed in a plate 103 between the angle-iron 95 and the bolt head 97.

Figure 2:
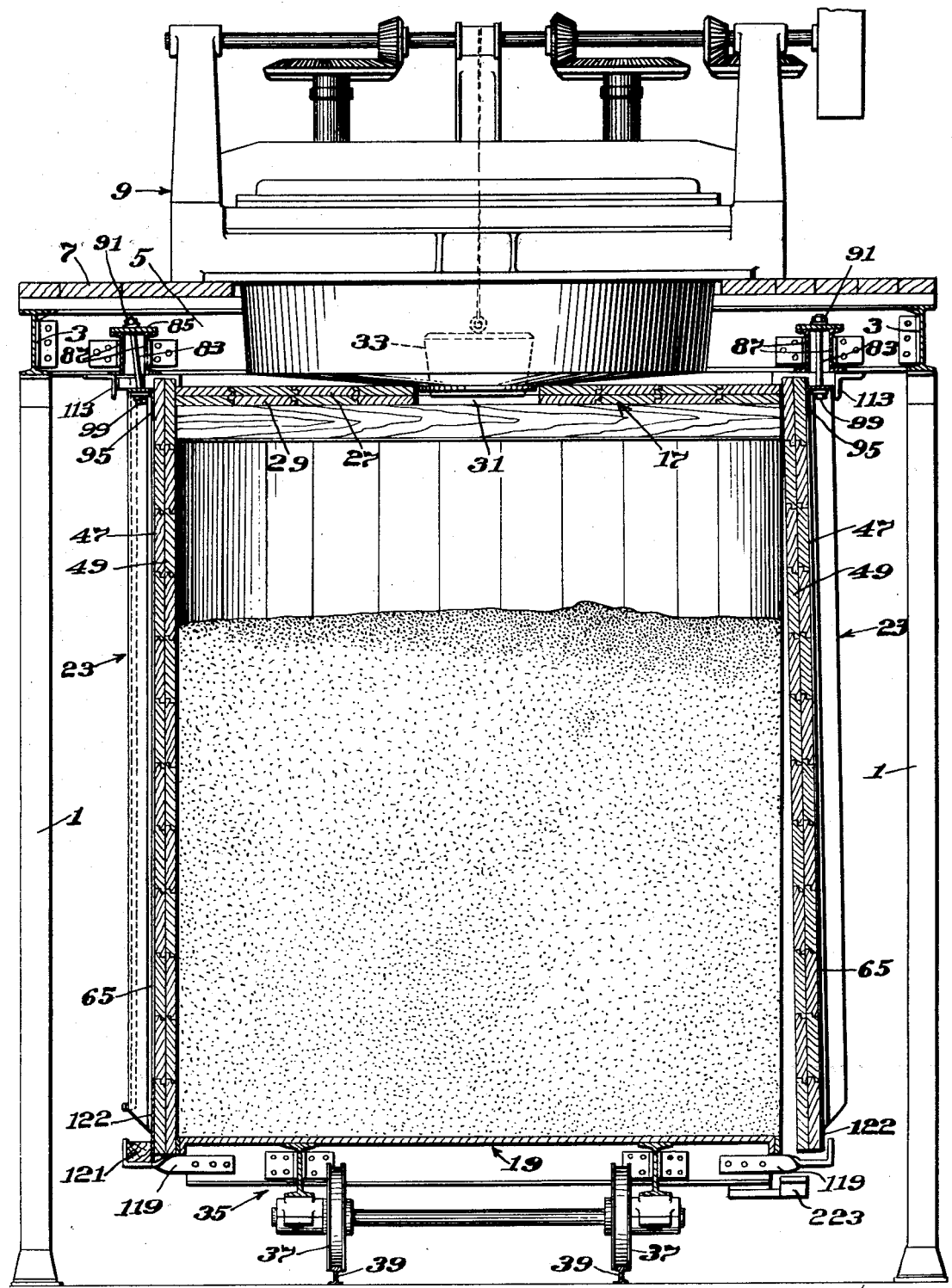

The construction is such that the side walls may have movement longitudinally in the direction of their planes, and transversely to said planes. Each side wall has its center of gravity offset from the points of pivotal connection of the hanger bolt heads 97 with their sockets when the wall is in inward or closed position, as will be noted in Fig. 13 and at the left of Fig. 2; so that when the wall is released by the means for securing it in closed position, it will automatically move outward and stand away from the block of acid phosphate as shown at the right of Fig. 2. If the sides of the block should not be parallel, the side walls may swing outward so as to prevent wedging of the block between the walls as the carriage travels toward the disintegrator.

Next will be described the means for releasably securing the walls in their closed positions, having reference more particularly to Figs. 1, 11, 12 and 14. This means comprises vertical shafts 103, each mounted in a bearing in a lower angle-iron bracket 105 secured to the wall, and in an upper bearing in the angle-iron 95 at the upper edge of the wall. A collar 108 on the shaft engages the lower angle-iron bracket 105 and prevents the shaft from falling therethrough. Fast on the upper end of the shaft is a cam 109 engaging a shim 111 bolted to an abutment 113 in the form of an angle-iron secured to a plate at the bottom of the channels 87, referred to, said shim being replaceable by a new one when worn. The lower end of the shaft may be bent to present a handle 115 adapted to be limited by engagement with either of a pair of stops 117 secured to the side wall. In the present instance, each wall is provided with four of these cam shafts.

The construction is such that the handles may be grasped and the shafts may be turned, thereby to cause the cams to react against the abutments and force the upper ends of the side walls against the top of the den and securely hold them in this position.

To lock the lower ends of the side walls against the floor of the den, the carriage may be provided with hook-shaped brackets 119 (Fig. 2) projecting out beyond the walls. Wooden wedges 121 may be driven between the brackets and metal strips 122 extending along the lower margins of the side walls, thereby to securely hold them against the floor of the den. The shims 65, referred to, extend between the metal strips 122 and the angle irons 95 at the upper edges of the side walls.

After the acid phosphate has solidified in the form of a block within the den, the wedges may be removed from the brackets, and the handles 115 may be grasped and the shafts turned, so that the cams will release their pressure on the side walls. Then the latter will automatically move outward and stand away from the block as described.

Figure 3:
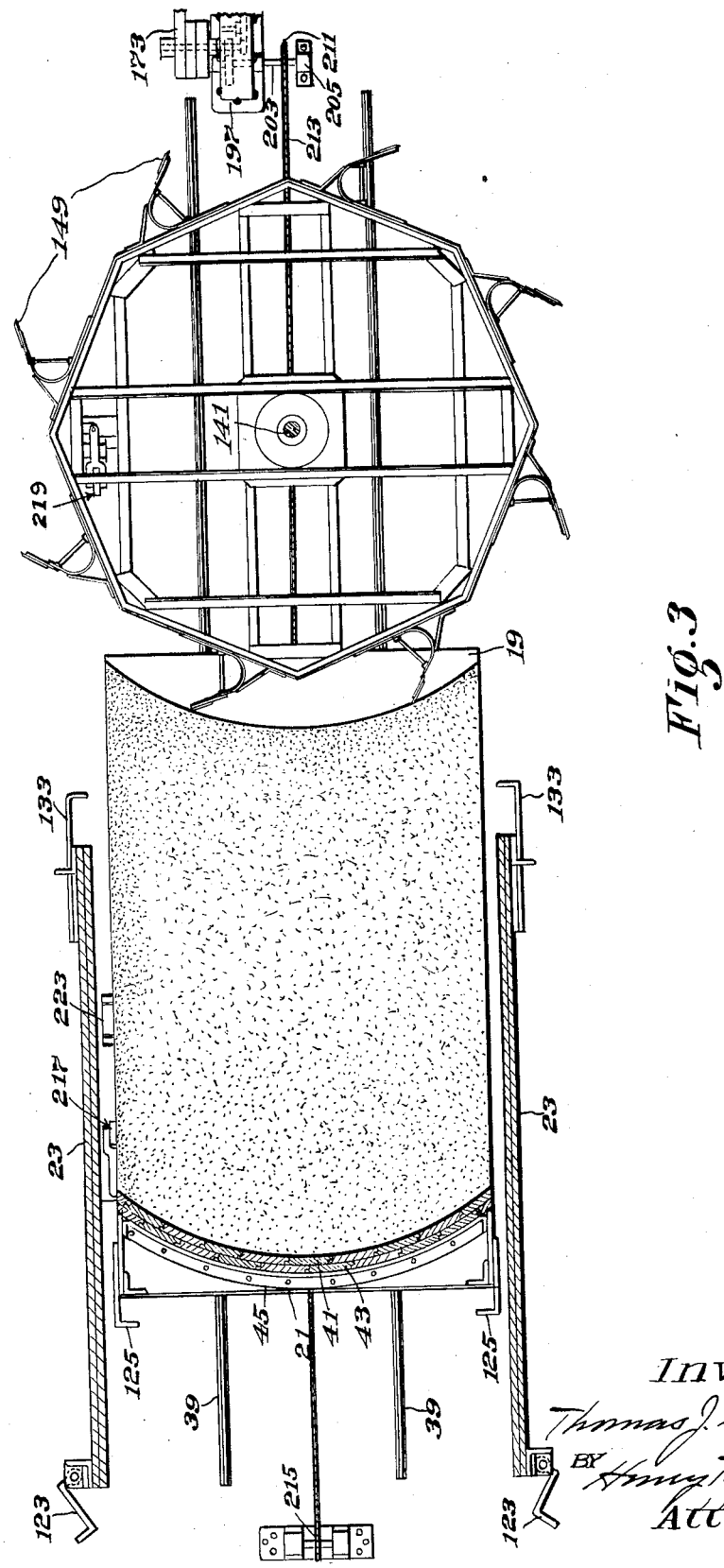

Suitable means may be provided to secure the side walls against the back wall of the den. To accomplish this, hooks 123 (Figs. 1, 3 and 5) are pivotally mounted on pins extending between angle brackets 124 secured to the rear margins of the side walls. Pairs of hooks 125 are secured to plates 127 rising from the floor of the carriage and extending between corner posts 129 and the back wall. Wooden wedges 131 may be driven in between the hooks 123 and 125, thereby to securely hold the ends of the side walls against the back wall. When the wedges are removed the hooks 123 may swing out between the brackets 124 (Fig. 3).

Suitable means may be provided to secure the front door tightly against the front ends of the side walls. To accomplish this, the side walls are provided with hooks 133 (Fig. 6) projecting through the front angle-irons 53 of the side walls, and the door may have angle-irons 135 extending vertically at the ends thereof. Wooden wedges 137 may be driven in between the hooks and the angle-irons, thereby to press the door securely against the ends of the side walls.

Figure 4:
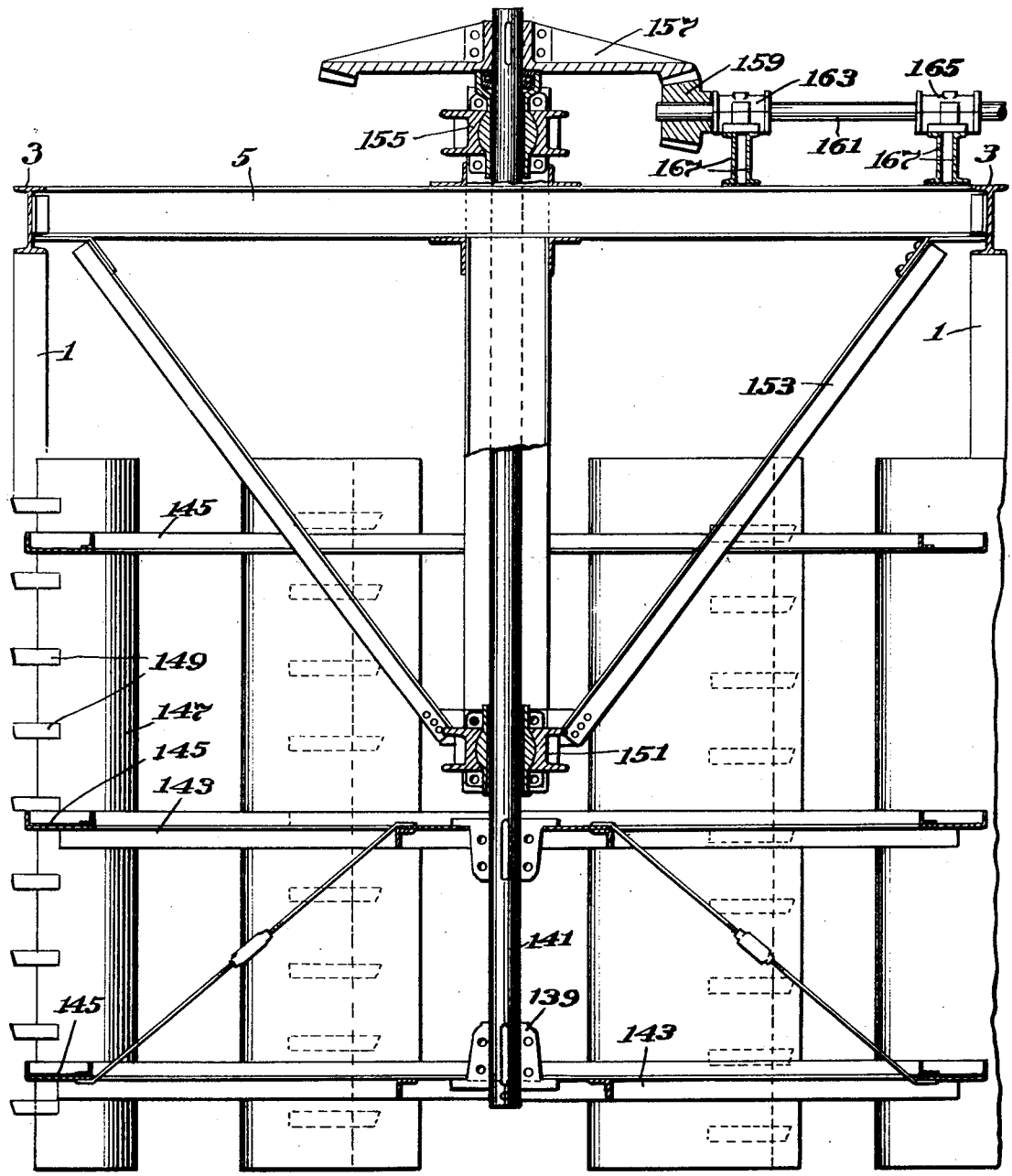

The disintegrator for excavating the block of acid phosphate, in the present instance, comprises hubs 139 (Figs. 1 and 4) fast on a vertical shaft 141. Secured to and projecting radially from the hubs are arms 143 connected to the two lower of three rings 145 each of channel-shaped section. Scoops 147 are secured to these rings, and cutters 149 are secured to and carried by the scoops, a series of cutters being provided on each scoop, and the cutters of the different scoops being in staggered relation. The shaft of the disintegrator is journalled in a bearing 151 carried by downwardly converging arms 153 secured to two of the cross beams 5 referred to. The upper portion of the shaft is journalled in a bearing 155 mounted on the cross beams. Both of these bearings are of the self-alining type. Fast on the upper end of the shaft is a gear 157 meshing with a pinion 159 on a shaft 161 journalled in bearings 163 and 165, each mounted on a pair of channels 167 mounted on the cross beams. The shaft 161 may be driven from any suitable source of power.

To feed the carriage along the rails toward and away from the disintegrator, an electric motor 169 (Figs. 1 and 17) may be provided having a wide pulley 171 adapted to be connected by a belt 173 with any one of the three pulleys 175, 177 and 179 (Fig. 15). The pulley 175 is fast on a shaft 181 journalled in bearings 183 and 185 mounted on suitable supports. The pulley 177 is loose on the shaft and serves as an idler between the two pulleys 175 and 179. Fast on said shaft is a pinion 187 meshing with a large gear 189 fast on a countershaft 191 journalled in bearings 193 and 195 on a casing 197. Also fast on the countershaft is a pinion 199 meshing with a gear 201 fast on a second countershaft 203 journalled in two bearings on the gear casing and in an outbored bearing 205.

The pulley 179 is fast on a sleeve shaft 207 through which the shaft 181, referred to, extends, suitable roller bearings being provided between the two shafts. Fast on a portion of the sleeve shaft which extends into the gear casing is a pinion 209 meshing with the large gear 201, referred to.

Fast on the countershaft 203 is a sprocket wheel 211 (Figs. 1 and 15) connected by a sprocket chain 213 with a sprocket wheel 215, ends of said chain being connected to opposite ends of the carriage.

The construction is such that when the motor driven belt 173 is shifted to the pulley 175, the latter will operate through the shaft 181, pinion 187, gear 189, pinion 199, gear 201, and shaft 203 to rotate the sprocket wheel 211. This will cause the carriage to have its slow work feed toward the disintegrator.

When the motor driven belt is shifted to the pulley 179, the latter will operate through the sleeve shaft 207, pinion 209 and gear 201 to rotate the shaft 203 and the sprocket wheel 211 and give the carriage its more rapid return feed away from the disintegrator.

The pulleys are rotated in the same direction, but the arrangement of the gears is such that when the pulley 175 is driven the carriage is fed toward the disintegrator, and when the pulley 179 is driven the carriage is fed away from the disintegrator.

Means is provided for automatically arresting the travel of the carriage at the ends of its travel. To accomplish this, a spring-pressed switch 217 (Figs. 3 and 17) is provided at one limit of travel of the carriage, and a spring-pressed switch 219 is provided at the other limit of travel of the carriage. These switches are in the electric circuit 221 of the motor 169. A shoe 223 is secured to the carriage. When the carriage approaches one limit of its travel, the shoe will engage the switch 217 and interrupt the motor circuit, thereby arresting the motor and the carriage; and when the carriage approaches its opposite limit of travel the shoe will engage the switch 219 and interrupt the circuit, thereby arresting the motor and the carriage. The shoe is sufficiently long to ride over the switches a short distance to insure holding the switches open while the carriage is coming to a stop.

A shunt line 225 is connected into the motor circuit beyond the switches and is provided with a hand actuated switch 227, the construction being such that this switch may be closed to complete the circuit to start the travel of the carriage. As soon as the shoe moves away from either of the switches 217 and 219, the hand switch 227 may be opened so that the automatic stopping of the carriage will be accomplished as described.

In the use of the apparatus, after a charge of the mixture has been introduced into the den and solidified, the door locking wedges 137 may be knocked out of place, and the door may be hoisted up away from the den. Then the wedges 131, which secure the side walls to the back wall, may be knocked out of place; and the wedges 121, which secure the lower ends of the side walls to the den floor, may be knocked out of place. The cam shafts may be turned to release the pressure of the cams on the upper ends of the side walls, thereby allowing the latter to automatically move outward and be wholly free from the block of acid phosphate. Then the carriage may be fed toward the disintegrator, which will gradually break down the materials and throw the same to one side of the carriage. They may be conveyed thence by a suitable conveyor to the storage pile.

Since the disintegrator does not travel and the carriage and block are fed toward the disintegrator, the cutters perform their operation and break down the material at one place and it is discharged at one point. The cutters are individually small and therefore each slices or cuts a small amount of the material from the block each time it traverses the face of the block in a horizontal path. Thus breaking off large chunks of the material and throwing them into the disintegrator with consequent liability of stopping rotation thereof are prevented. Also the scoops are made sufficiently large properly to aerate the material as it is disintegrated from the block and thrown to one side of the carriage.

It will be understood that the invention is not limited to the specific embodiment shown, and that various deviations may be made therefrom without departing from the spirit and scope of the appended claims.

What is claimed is:—

1. Apparatus for manufacturing acid phosphate comprising, in combination, a support, a den having a top, a back wall, side walls and a front door, hangers pivotally mounted on the support and connected to the side walls, and releasable means for securing the side walls in clased positions, said hangers being arranged so that the side walls, on release of the securing means, will automatically move bodily and stand away from a block of said phosphate in the den.

2. Apparatus for manufacturing acid phosphate comprising, in combination, a support, a den having a top, a back wall, side walls and a front door, hangers pivotally mounted on the support and connected to the side walls, abutments on the support and cams mounted on the side walls adapted to react against the abutments and hold the side walls in closed position.

3. Apparatus for manufacturing acid phosphate comprising, in combination, a support, a den having a top, a back wall, side walls and a front door, hangers pivotally mounted on the support and connected to the side walls, abutments on the support, cams mounted on the side walls opposite the abutments, and shafts for the cams having handles for turning the cams relatively to the abutments to secure or release the side walls.

4. Apparatus for manufacturing acid phosphate comprising, in combination, a support, a den having a top, a back wall and side walls, brackets at the upper ends of the side walls, and hanger bolts connecting the brackets with the support, said hanger bolts having provision permitting the side walls automatically to swing outward away from sides of a block of acid phosphate in the den.

5. Apparatus for manufacturing acid phosphate comprising, in combination, a support, a den having a top, a back wall, side walls and a door, and means to suspend the side walls from the support, each of the side walls comprising two layers of planking, ribs extending along the outer layer of planking, and bolts connecting the ribs and planking, some of the bolts passing through both layers and others of the bolts passing through the ribs and the outer layer of the planking only.

6. Apparatus for manufacturing acid phosphate comprising, in combination, a support, a den having a top, a back wall, side walls and a door, hangers connecting the side walls with the support, each of said side walls comprising outer and inner layers of planking, ribs extending along the outer layer of planking, and bolts for connecting the ribs with the planking, some of said bolts extending through both layers of planking and having heads in countersunk holes in the inner layer of planking, and plugs in said holes covering the bolt heads to protect them from the acid phosphate in the den.

7. Apparatus for manufacturing acid phosphate, comprising, in combination, a support comprising uprights, side beams mounted on the uprights, cross beams extending between and connected to the longitudinal beams, pairs of channels extending between and connected to the cross beams, plates on the pairs of channels having holes therein and sockets, hangers projecting through the holes in said plates and having rounded heads seated in the sockets, and a den beneath the cross beams having a floor and side walls connected to and suspended from the hanger bolts.

8. Apparatus for manufacturing acid phosphate, comprising, in combination, a support, and a den for receiving acid phosphate comprising a carriage having a floor and a back wall thereon, side walls for the den, means suspending the side walls from the support, and securing means on the side walls reacting on the support to move the side walls inward, said suspending means being constructed and arranged to allow the side walls to move away from a block of acid phosphate in the den on release of the securing means.

9. Apparatus for manufacturing acid phosphate, comprising, in combination, a support, a den comprising a carriage having a floor and a back wall thereon, side walls suspended from the support, abutments on the support, shafts on the side walls, cams on the shafts cooperating with the abutments to lock the upper ends of the side walls in inward position, brackets on the carriage, and wedges for insertion between the brackets and the side walls to lock the lower ends of the latter in inward position.

10. Apparatus for manufacturing acid phosphate, comprising, in combination, a support, a den comprising a carriage having a floor and a back wall thereon, a top carried by the support, side walls extending between the top and floor, hangers suspending the upper ends of the side walls from the support, cam means for moving and locking the upper ends of the side walls to the top, brackets on the carriage, and wedges between the brackets and the lower ends of the side walls to lock the same against the floor, said hangers having provision for allowing the side walls to move away from the top and floor on release of the cam means and removal of the wedges.

11. Apparatus for manufacturing acid phosphate, comprising, in combination, a support, a den comprising a carriage having a floor and a back wall formed of outer and inner layers of planking, ribs extending along and secured to said planking, side walls suspended from the support and formed of outer and inner layers of planking, ribs extending along and secured to the outer layers of the side walls, a door formed of outer and inner layers of planking, means to secure the side walls against ends of the back wall, and means to secure the door against the side walls.

12. Apparatus for manufacturing acid phosphate, comprising, in combination, a support, a den comprising a carriage having a floor and a back wall thereon, side walls, hangers for the side walls mounted on the support and permitting the side walls to move longitudinally and transversely thereof, a door, means releasably to lock the side walls in inward position, means releasably to lock the side walls against the back wall, and means releasably to lock the door against the side walls.

THOMAS J. STURTEVANT.